United States Patent
Tessier et al.

[11] Patent Number: 6,056,878
[45] Date of Patent: May 2, 2000

[54] METHOD AND APPARATUS FOR REDUCING SCALING IN ELECTRODEIONIZATION SYSTEMS AND FOR IMPROVING EFFICIENCY THEREOF

[75] Inventors: David Florian Tessier, Guelph; Tom Kosir, Burlington; Steve Siverns, Hamilton; Mark Philip Huehnergard, Kitchener; Robert Glegg, Campbellville, all of Canada

[73] Assignee: E-CELL Corporation, Guelph, Canada

[21] Appl. No.: 09/127,975

[22] Filed: Aug. 3, 1998

[51] Int. Cl.[7] .......................... B01D 15/04; B01D 61/48; B01D 61/02; B03D 3/06
[52] U.S. Cl. .......................... 210/639; 210/652; 210/669; 210/685; 210/805; 210/696; 204/524; 204/525
[58] Field of Search .................................... 210/636, 638, 210/639, 652, 669, 685, 748, 805, 806, 696, 697, 698, 699, 700; 204/524, 525, 533, 632, 633, 637

[56] References Cited

U.S. PATENT DOCUMENTS

| | | |
|---|---|---|
| 4,676,908 | 6/1987 | Ciepiela et al. .......................... 204/525 |
| 5,358,640 | 10/1994 | Zeiher et al. .......................... 210/639 |
| 5,837,124 | 11/1998 | Su et al. .................................... 204/525 |

FOREIGN PATENT DOCUMENTS

| | | |
|---|---|---|
| 839762 | 5/1998 | European Pat. Off. . |
| 9024374 | 1/1997 | Japan . |
| WO 97/34696 | 9/1997 | WIPO . |

OTHER PUBLICATIONS

Studies on polarity reversal with continuous deionization—Desalination, 86 (1992) by Yoram Oren and Yair Egozy (pp. 155–171).

*Primary Examiner*—Joseph W. Drodge
*Attorney, Agent, or Firm*—Arne I. Fors

[57] ABSTRACT

A method and apparatus for inhibiting scaling in an electrodeionization system or in a combined reverse osmosis/electrodeionization system for water treatment and, more particularly, for increasing tolerance to hardness in the feed water to an electrodeionization unit to inhibit precipitation of metal cations contained in the feed water and for increasing efficiency of the electrodeionization system. Water to be purified is passed through a electrodeionization unit in which a concentrate stream recycling through concentrating compartments and anode and cathode compartments contains effective amounts of an antiscalant to inhibit precipitation of scale. One or more preliminary reverse osmosis units in series with the electrodeionization unit preferably receives a portion of the antiscalants in the concentrate stream. The antiscalant in the water fed to the reverse osmosis unit can be supplemented and adjusted. Electrolyte can be provided to the concentrate stream of the electrodeionization unit from products of the reverse osmosis.

12 Claims, 6 Drawing Sheets

METHOD AND APPARATUS FOR REDUCING SCALING IN ELECTRODEIONIZATION SYSTEMS AND FOR IMPROVING EFFICIENCY THEREOF

BACKGROUND OF THE INVENTION (i) Field of the Invention

The present invention relates to a method and apparatus for inhibiting scaling in an electrodeionization system or in a combined reverse osmosis/electrodeionization system for water treatment and, more particularly, for increasing tolerance to hardness in the feed water to an electrodeionization unit to inhibit precipitation of metal cations contained in the feed water and for increasing efficiency of the electrodeionization system.

(ii) Description of the Related Art

The purification of liquid has become of great interest in many industries. In particular, pure water is used for many industrial purposes such as, in processes for producing semiconductor chips, in power plants, in the petro chemical industry and for many other purposes.

Ion exchange resins, reverse osmosis filtration and electrodialysis techniques have been used to reduce the concentration of ions in a liquid.

Electrodeionization apparatus have recently been used with more frequency to reduce the concentration of ions in a liquid. The term "electrodeionization" generally refers to an apparatus and a process for purifying liquids which combine ion exchange resins, ion exchange membranes and electricity to purify the liquids. An electrodeionization module comprises alternating arrangements of cation permeable alternating compartments, there is provided ion exchange resin beads. Those compartments are known as diluting compartments. The compartments which generally do not contain ion exchange resin are known as the concentrating compartments. Ions migrate from the diluting compartments through ion exchange beads and ion permeable membranes into the concentrating compartments by the introduction of current. The liquid flowing through the concentrating compartments is discarded or partially recycled and the purified liquid flowing through the diluting compartments is recovered as demineralized liquid product.

Scaling of electrodeionization equipment is of particular concern as it reduces membrane efficiencies and fouls electrode surfaces. Scaling has been found to occur in localized regions of electrodeionization equipment, and particularly those where high pH is typically present. Such regions include those on the surface of the concentrate-chamber side of anion exchange membranes, due to the flux of hydroxyl ions resulting from the regenerative water splitting process in the diluting chambers. Localized regions of high pH are also typically present on the cathode surface due to the evolution of hydrogen gas and concomitant production of hydroxyl ion according to the cathodic electrode reaction:

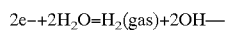

These localized regions of high pH provide conditions under which scales harmful to the performance of the electrodeionization device can form. Generally, these scales form in the presence of polyvalent metal cations such as $Ca^{2+}$, $Mg^{2+}$, $Sr^{2+}$, $Ba^{2+}$, $Fe^{3+}$, $Al^{3+}$ and the like which can precipitate under local high pH conditions as hydroxides, sulphates, phosphates, oxides and carbonates, when carbonate, bicarbonate or carbon dioxide are present and as mixed oxides such as spinels, mixed carbonates and fluorides, when fluoride ions are present. Due to the low solubility products of these compounds, even trace amounts of these metal cations and counter anions in the concentrate streams will be sufficient to cause undesirable precipitation.

In reverse osmosis, as water passes through the membrane driven by the pressure difference between concentrate and permeate streams, the concentrate stream becomes progressively more concentrated and the solubility limit of salts of the dissolved ions can be exceeded, leading to precipitation of $CaCO_3$ and other solids as scale. This mechanism of scale formation is fundamentally different from that in electrodeionization where the anion membranes surfaces (concentrate side) are actively maintained at a high pH due to the migration of hydroxyl ions from water splitting in the diluting chambers.

Antiscalants are used to prevent growth of such scales. These act by a number of mechanisms, including: a) inhibiting the nucleation of scale particles, usually with a sub-stoichiometric amount of antiscalant compared with scale forming ions; b) inhibiting the growth of scale particles, usually with a sub-stoichiometric amount of antiscalant compared with scale forming ions; c) solution complexing of the ions of the scale, thereby lowering the thermodynamic tendency (Gibbs energy change) for scale to form, and usually using a stoichiometric amount of antiscalant (chelating agent) compared with scale forming ions. Due to the relatively high concentration of ions in typical reverse osmosis feed water, effects a) and b) are usually effected by the introduction of antiscalant to the reverse osmosis feed. Lowering of the reverse osmosis feed pH is also commonly practised. The net effect is to permit operation of reverse osmosis systems at higher recovery than otherwise possible.

Although it is known to add antiscalants to reverse osmosis, it is not conventional practice to add antiscalants to electrodeionization cells for reducing scale formation. A paper entitled Studies on Polarity Reversal with Continuous Deionization by Yoram Oren et al. published in Desalination, 86 (1992) 155–172 by Elsevier Science Publishers B.V., Amsterdam, states that scale formation in continuous deionization, i.e., electrodeionization, can be minimized by reducing the concentration of calcium and magnesium (softening) or acidification which reduces pH in sensitive areas, or addition of antiscalants to form complexes with the calcium or magnesium ions or to delay precipitation. However, it is further stated that all such solutions add undesirable chemicals to the water and require equipment to introduce the chemicals.

SUMMARY OF THE INVENTION

In its broad aspect, the method of the invention for inhibiting formation of scale in an electrodeionization unit for deionizing water having an anode compartment at one end of the unit, a cathode compartment at the opposite end of the unit, and a plurality of diluting compartments alternating with concentrating compartments positioned between the said anode and cathode compartments comprises passing feed water to be deionized through the diluting compartments; passing water or an aqueous solution for accepting ions from the feed water through the concentrating compartments, and through the anode and cathode compartments; applying an electrical voltage between the said anode and the said cathode whereby ions in the feed water migrate to the water or aqueous solution in the concentrating compartments; collecting and discharging aqueous solution from the anode and cathode compartments; recycling water or aqueous solution from the concentrating compartments as a concentrate stream through the concentrating compartments and through the anode and cathode compartments; and injecting an antiscalant to the concentrate stream recycling through the concentrating compartments and through the anode and cathode compartments in an amount effective to inhibit scale formation in the concentrating compartments and in the cathode compartment. The effective amount of antiscalant in the concentrate stream is in the range of 1 to 400 ppm, and may be selected from the group consisting of sulphuric acid, hydrochloric acid, polyacrylic acid, derivatives of polyacrylic acids co-polymerized with sulfonates, phosphonate-type antiscalants, sodium hexametaphosphate, EDTA and CDTA complexing agents, amido succinic acid chelating agent, non-oxidizing biocidal agents typified by sodium bisulphite, and combinations thereof.

In a preferred aspect of the invention, the method for purifying and deionizing water for inhibiting formation of scale in a reverse osmosis in an electrodeionization unit in series in which water to be purified and deionized passes through the reverse osmosis unit to produce a permeate stream and a retentate discharge stream, and in which the electrodeionization unit has an anode compartment at one end of the unit, a cathode compartment at the opposite end of the unit, and a plurality of diluting compartments alternating with concentrating compartments positioned between the said anode and cathode compartments, comprises passing feed water to be purified and deionized through the reverse osmosis unit; passing permeate from the reverse osmosis unit through the diluting compartmetns of the deionization unit; passing water or an aqueous solution for accepting ions from the feed water through the concentrating compartments, and through the anode and cathode compartments; applying an electrical voltage between the through the anode and cathode compartments; applying an electrical voltage between the said anode and the said cathode whereby ions in the feed water migrate to the water or aqueous solution in the concentrating compartments; collecting and discharging aqueous solution from the anode and cathode compartments; recycling water or aqueous solution from the concentrating compartments as a concentrate stream through the concentrating compartments and through the anode and cathode compartments; injecting an antiscalant to the concentrate stream recycling through the concentrating compartments and through the anode and cathode compartments effective to inhibit scale formation in the concentrating compartments and in the cathode compartment; bleeding a portion of the concentrate stream containing antiscalant; and combining and passing said portion of the bled concentrate containing an amount of antiscalant with the feed water through the reverse osmosis unit, adjusting the amount of antiscalant in the water to the reverse osmosis unit to provide an effective amount of antiscalant to inhibit scale formation in the reverse osmosis unit, and passing the permeate stream through the dilute compartments of the deionization unit.

The feed water can be subjected to reverse osmosis in a plurality of passes, each pass comprising one or more stages, wherein permeate from at least one of the stages or one of the passes is combined with the concentrate stream for passage through the concentrating compartments and through the anode and cathode compartments to add electrolyte thereto, thereby increasing electrical conductivity. The retentate from at least one of the stages, excepting from the first reverse osmosis pass, can be combined with the concentrate stream for passage through the concentrating compartments. The antiscalant can be sulphuric acid in the range of about 500 to 0.5 ppm, hydrochloric acid in the range of about 365 to about 0.4 ppm or sodium hexametaphosphate in an amount in the range of about 5 to about 200 ppm, preferably about 25 to about 100 ppm.

The antiscalant in the water to the reverse osmosis unit preferably is adjusted to an amount in the range of 1 to 75 ppm effective to inhibit scaling therein.

In a further embodiment of the invention, a portion of the permeate is added to the concentrate stream passing through the concentrating compartments and through the anode and cathode compartments to provide electrolyte thereto, whereby electrical conductivity is increased.

BRIEF DESCRIPTION OF THE DRAWINGS

The method and apparatus of the invention will now be described with reference to the accompanying drawings, in which.

DESCRIPTION OF THE PREFERRED EMBODIMENT

The processes of the present invention will be described with reference to the accompanying drawings. In general, the invention is applicable to water purification processes which are carried out using an electrodeionization unit or with an electrodeionization unit and reverse osmosis unit in series.

Figure 1:
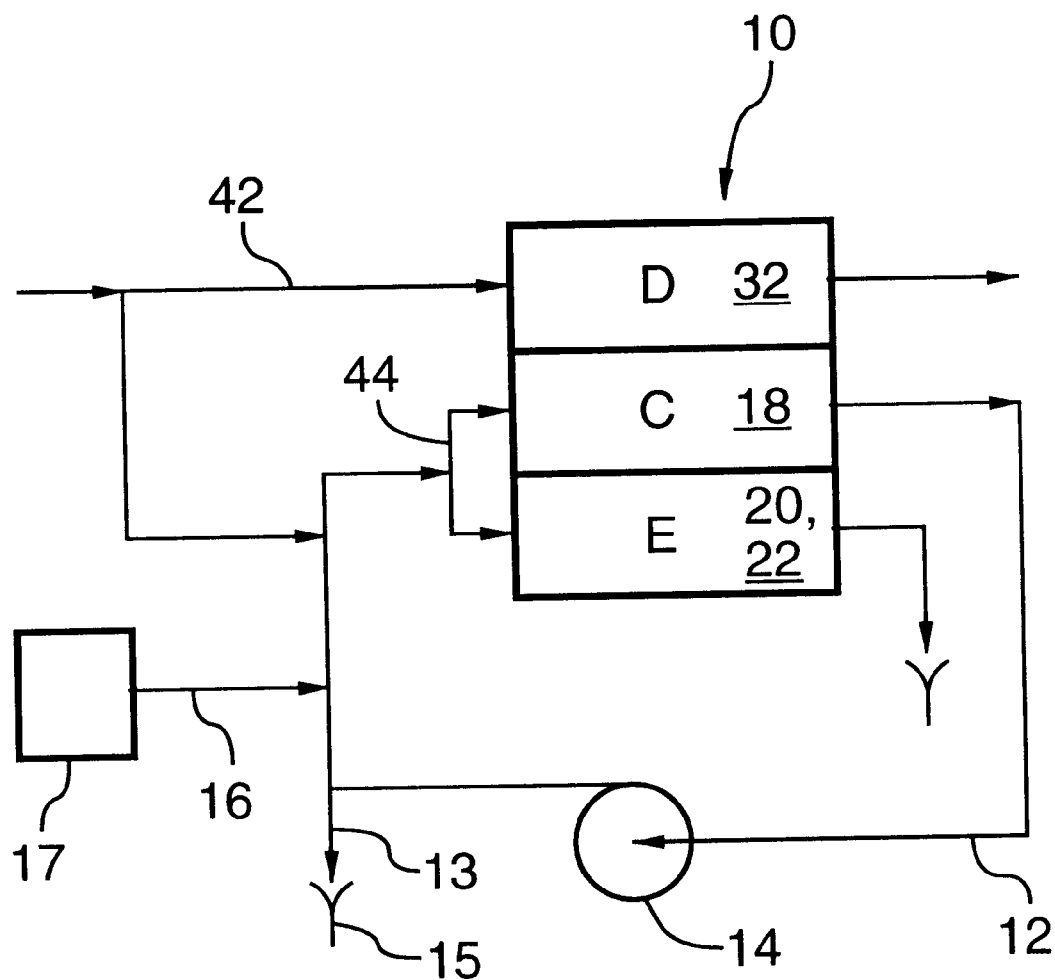
FIG. 1 is a schematic flowsheet of a first embodiment of the present invention.

Referring first to FIG. 1, the embodiment of the present invention illustrated comprises a process for purifying water including an electrodeionization unit 10, a recirculation loop 12 having pump 14 for recycle of concentrate solution, a concentrate bleed line 13 to drain 15, and an injection line 16 for injecting antiscalants acids from injection unit 17 into the concentrate compartments 18 and the anode and cathode compartments 20 and 22 respectively.

Figure 2:
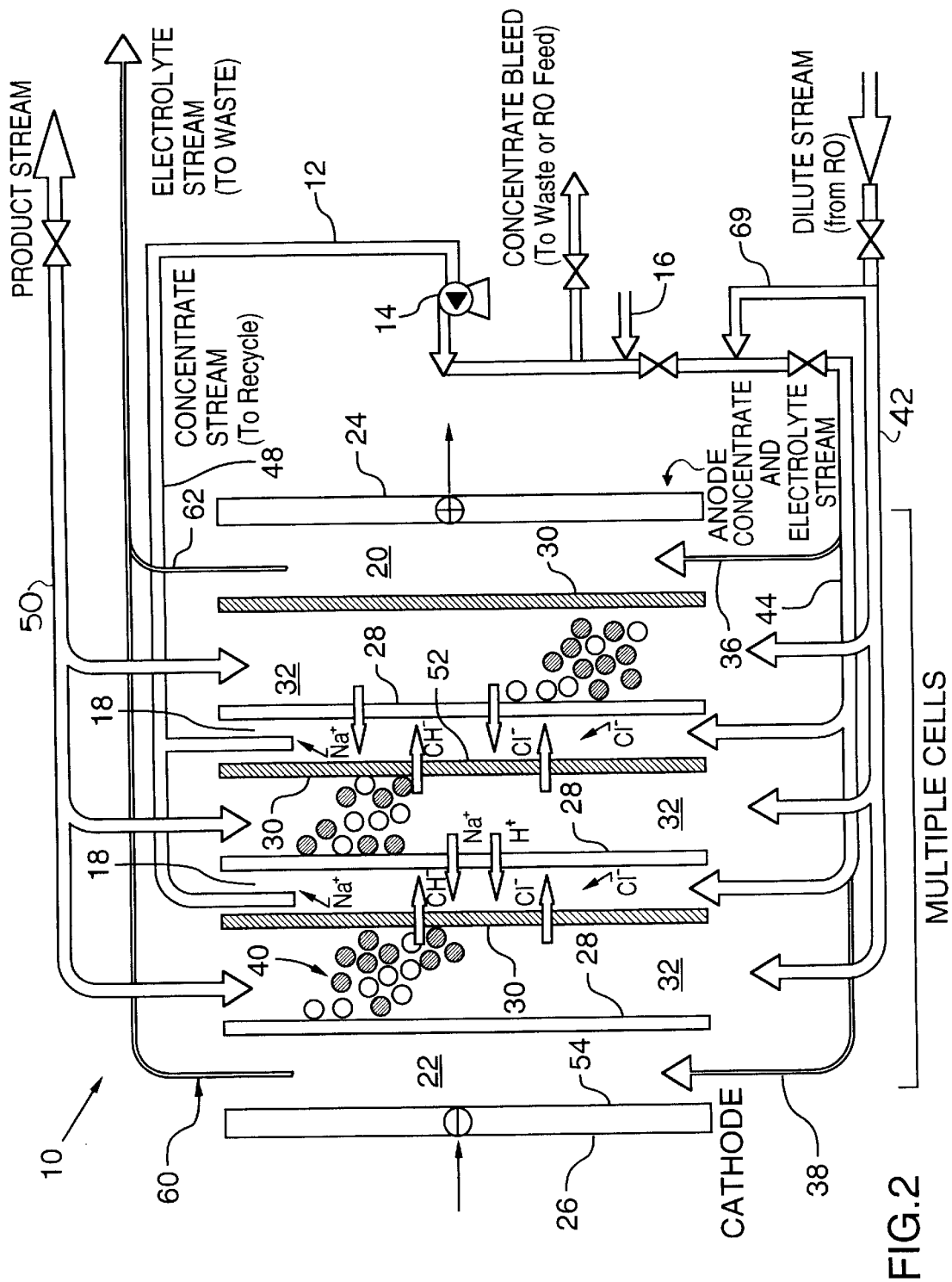
FIG. 2 is a schematic drawing of an electrodeionization unit of the present invention embodying the embodiment shown in FIG. 1.

Referring now to FIG. 2, the electrodeionization unit 10 in accordance with the present invention, described in more detail, comprises the anode compartment 20 provided with an anode 24 and the cathode compartment 22 provided with a cathode 26. A plurality of cation exchange membranes 28 and anion exchange membranes 30 are alternately arranged between the anode compartment 20 and the cathode compartment 22 to form diluting compartments 32 each defined by anion exchange membrane 30 on the anode side and by a cation exchange membrane 28 on the cathode side and concentrating compartments 18 each defined by a cation exchange membrane 28 on the anode side and by an anion exchange membrane 30 on the cathode side. Electrolyte solution is supplied to anode compartment 20 and to cathode compartment 22 via flowstreams 36 and 38 respectively.

Ion exchange material such as ion exchange resin beads designated by numeral 40 preferably are provided in diluting compartments 32. These may comprise either anion or cation exchange resins or a mixture thereof, mixed bed, layers, continuous/discontinuous phases, and the like, such as disclosed in PCT Application No. Serial No. PCT/CA97/00018, incorporated herein by reference. Such media enhance water purification by removing unwanted ions by ion exchange. Further, such media facilitate migration of ions towards membranes 28 and 30 for subsequent permeation therethrough, as will be described hereinbelow.

Water to be treated is introduced into the diluting compartments 32 from supply stream 42. Similarly, water or an aqueous solution is introduced into the concentrating compartments 18 and into the anode and cathode compartments 20, 22 from a supply stream 44. A predetermined electrical voltage is applied between the two electrodes whereby anions in diluting compartments 32 permeate through anion exchange membranes 30 and into concentrating compartments 18 while cations in streams in diluting compartments 32 permeate through cation exchange membranes 28 and into concentrating compartments 18. The above-described migration of anions and cations is further facilitated by the ion exchange material 40 present in diluting compartments 32. In this respect, driven by the applied voltage, cations in diluting compartments 32 migrate through cation exchange resins using ion exchange mechanisms, and eventually pass through cation exchange membranes 28 which are in direct contact with the cation exchange resins. Similarly, anions in diluting compartments 32 migrate through anion exchange resins using ion exchange mechanisms, and eventually pass through anion exchange membranes 30 which are in direct contact with the anion exchange resins. Aqueous solution or water introduced into concentrating compartments 18 from stream 44, and anion and cation species which subsequently migrate into these compartments, are collected and removed as a concentrated solution from discharge stream 48, while a purified water stream is discharged from diluting compartments 32 as discharge stream 50.

By virtue of the current flowing between the cathode 26 in the cathode compartment 22 and the anode 24 in the anode compartment 20, water is ionized into hydrogen and hydroxyl ions. Hydroxyl ions migrate through the anion exchange membrane 30 and become locally concentrated on the surface 52 of the concentrate compartment side of the anion exchange membrane 30. This creates a localized region of high pH near this surface 52 of the anion exchange membrane 30, thereby promoting the formation of scale.

Localized regions of high pH are also found at the cathode surface 54 of the electrodeionization unit. In this environment, reduction of water to form hydrogen gas, with the concomitant production of hydroxyl ion, is thermodynamically favourable. As a result, conditions near the cathode surface 54 also are conducive to the formation of scale.

To prevent the formation of scale on the surfaces 52 of the anion exchange membrane 30 and at the cathode surface 54, an antiscalant supply 16 is provided for injecting antiscalant into the concentrate stream in loop circuit 12 for feed to concentrate compartment 18 and to anode compartment 20 and to cathode compartment 22. Antiscalants may include sulphuric and hydrochloric acids to lower the pH; polyacrylic acids, derivatives of polyacrylic acids (eg. co-polymers with sulfonate functional groups), phosphonate-type antiscalants, sodium hexametaphosphate; complexing agents such as EDTA, CDTA, amido succinic acid and the like chelating agents; and biocidal agents, preferably non-oxidizing, such as sodium bisulphite, and combinations thereof. In this respect, antiscalant supply 16 infuses an effective amount of antiscalant into concentrate compartment supply stream 44 and cathode electrolyte supply stream 38 to provide a concentration in the streams in the range of 1 to 500 parts per million (ppm). A desirable pH range for the concentrate stream to inhibit scaling in the electrodeionization units is about 2 to about 5, provided by about 500 to about 0.5 ppm for sulphuric acid and by about 365 to about 0.37 ppm for hydrochloric acid. A preferred concentration range for sodium hexametaphosphate is about 5 to about 200 ppm, most preferably in the range of 25 to 100 ppm. As a result, antiscalant circulates through both concentrate compartments 18 and cathode compartment 22, inhibiting formation of scale, and is thereafter discharged through streams 48 and 60, respectively, the concentrate stream being recycled with bleed stream 61 fed to a reverse osmosis unit, to be described, or passed to waste.

To recover and recycle antiscalant from the concentrate compartments 18, discharge stream 48 is recirculated through line 12 with make-up solution containing antiscalant from injection unit 17 through feed line 16 for continuous supply of antiscalant to concentrate compartments 18 and to anode compartment 20 and to cathode compartment 22. Antiscalant thus is used more efficiently in the process of the present invention by recovery and recycle of most of the unused antiscalant from the discharge of the electrodeionization unit 10.

Figure 3:
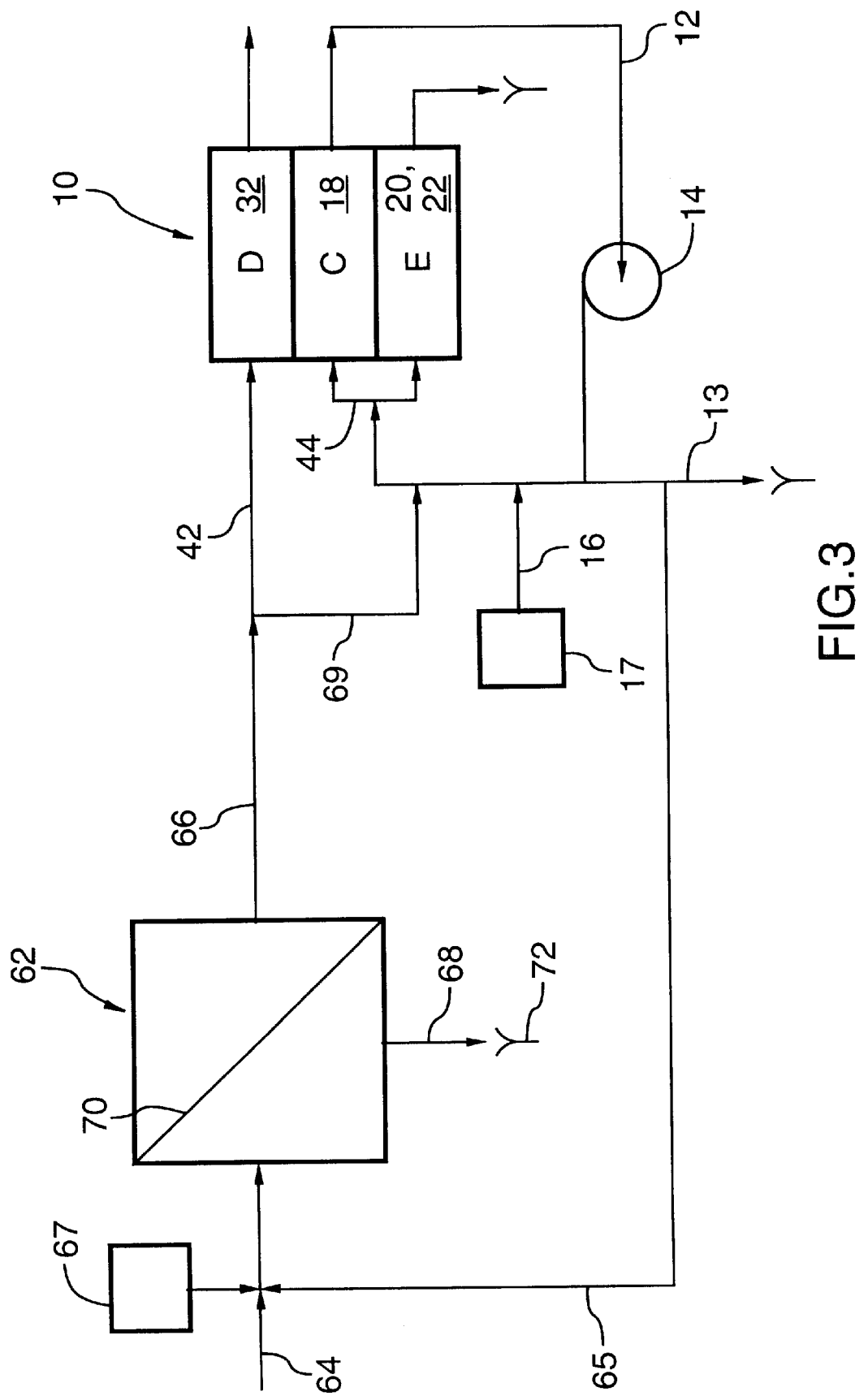
FIG. 3 is a schematic flowsheet of a second embodiment of the present invention in conjunction with the embodiment shown in FIG. 1.

In the embodiment of the present invention illustrated in FIG. 3, electrodeionization unit 10 is operated in series with reverse osmosis unit 62 for the purification of water. Water to be treated is supplied into the reverse osmosis unit 62 by supply stream 64, wherein the supplied water is separated into permeate stream 66 and retentate stream 68 by membrane 70, well known in the art, and discharged to drain 72. The permeate stream 66 is connected to supply stream 42 for further treatment in the electrodeionization unit 10, whereas retentate stream 68 either is discharged to drain 72 or is used for other purposes, such as in cooling towers.

Scale deposition is also a phenomenon which adversely effects operation of the reverse osmosis unit 62. In reverse osmosis, salt for example is separated from an aqueous salt solution by forcing water to flow through a membrane into a purified water phase by applying a pressure greater than the normal osmotic pressure, thereby overcoming the natural tendency of water to flow in the opposite direction. As a result, the saline solution becomes progressively more concentrated. In this extreme, the solubility limit of the dissolved salts are exceeded, leading to precipitation of $CaCO_3$ and other solids as scale. This mechanism of scale formation is fundamentally different from that in electrodeionization wherein the anion membranes' surfaces (concentrate side) are actively maintained at a high pH due to the migration of hydroxyl ions from water splitting in the diluting chambers; this high pH producing scaling.

Advantageously, a portion of antiscalant in circulating discharge stream 12 from the concentrate compartments 18 can be utilized in the reverse osmosis unit 62 by way of line 65 connected to supply water stream 64. Loss of antiscalant from the electrodeionization unit 10 accordingly is reduced while scale formation in the reverse osmosis unit 62 is inhibited.

In a further embodiment, antiscalant from concentrate compartment discharge in line 65 may be topped up before injection into reverse osmosis unit 36. Referring to FIG. 3, a second antiscalant injection unit 67 may be provided upstream of the inlet of reverse osmosis unit 36 for addition of an effective amount of antiscalant to supplement the antiscalant from concentrate compartment discharge stream 34, or to add a complementary agent.

Further variations to the embodiments illustrated in FIG. 3 are contemplated and not limited to those shown. For example, permeate stream 66 may be further purified by passage through an additional reverse osmosis unit, to be described, or could be subjected to other separation processes, such as degasification, or other chemical treatments, or combinations thereof, prior to feed to the electrodeionization unit 10.

To increase electrical conductivity in the electrodeionization unit 10 and, thereby, increase current flow with reduced voltage to reduce power consumption, another embodiment of the present invention provides for diverting a portion of permeate stream 66 of the reverse osmosis unit 62 to the electrodeionization unit 10 such that part of the permeate stream 69 is fed to the concentrate compartments 18. Permeate stream 66 and retentate discharge stream 68 contain electrolytes, such as dissolved salt ions. Connection to either of these streams 66 or 68 could provide make-up of electrolyte and water in the concentrate compartment supply stream 44. Preferably, retentate discharge stream 68 is not connected in this manner unless such retentate discharge stream 68 is relatively free of polyvalent cations, high molecular weight organic compounds and bacteria, which could otherwise foul the electrodeionization unit 10. Therefore, if the water supply stream 64 contains such impurities, line 69 from the permeate stream 66, but not from the retentate stream 68, may be connected to supply stream 44 for electrolyte make-up in the concentrate compartments 18 of the electrodeionization unit.

Figure 4:
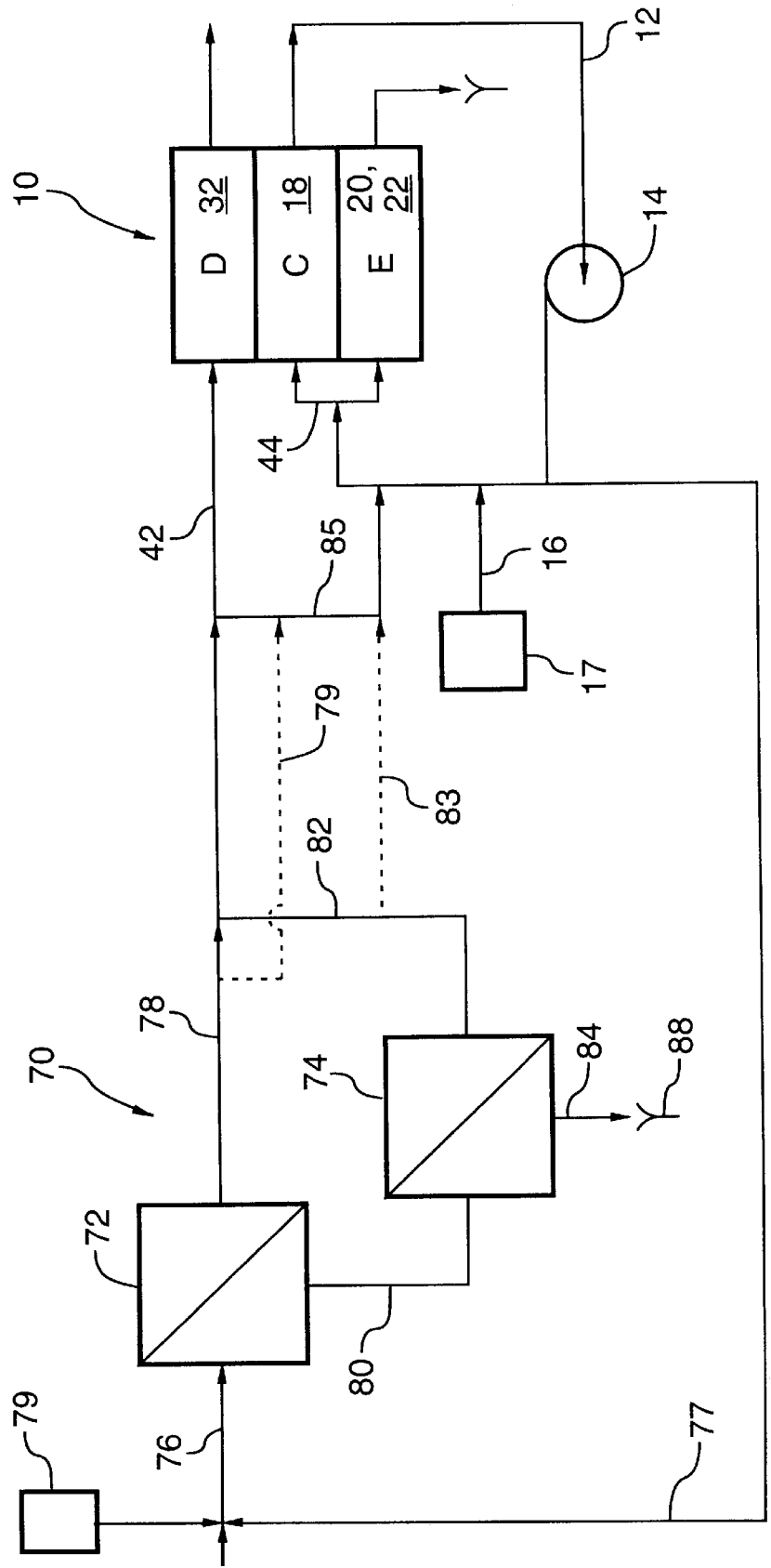
FIG. 4 is a schematic flowsheet of a third embodiment of the present invention in conjunction with the embodiment shown in FIG. 1.

In a further embodiment of the present invention illustrated in FIG. 4, the water purification system of the invention consists of a multi-stage reverse osmosis system 70 in series with an electrodeionization unit 10. The multi-stage reverse osmosis system 70 comprises two stages consisting of first and second reverse osmosis stages 72 and 74 respectively. Water to be purified is supplied to the first reverse osmosis unit 70 by supply stream 76, together with a portion of the concentrate loop solution in line 12 by way of line 77 and is separated into a first permeate stream 78 and first retentate stream 80 by membrane processes occurring therein. Retentate stream 80 is discharged into the second reverse osmosis unit 74 and is subjected to membrane processes therein, causing separation of first retentate stream 80 into second permeate stream 82 and second retentate stream 84. The second permeate stream 82 joins the first permeate stream 78 and is connected to supply stream 42 to the electrodeionization unit 10 for further treatment. The second retentate stream 84 either is discharged to drain 88, or used for other purposes such as in cooling towers. To provide electrolyte make-up in the feed to the concentrate compartment 18 of the electrodeionization unit 10, a bleed from second permeate stream 82 by line 83, or from supply stream 42 for a combination of permeate streams 78, 82 through line 85 can be added to recycle stream 44 to the concentrate compartments 18.

Antiscalant from the concentrate compartment discharge in line 77 can be topped up by a second antiscalant injection unit 79.

It will be understood that the number of reverse osmosis stages in the reverse osmosis system is not limited to two, and could include any plurality of stages, hereinafter denoted as "n-stages", each containing a reverse osmosis unit, so as to effect economic purification and recovery of water. In this respect, the retentate streams from stages 1 through (n−1) are successively discharged into the following downstream reverse osmosis stages 2 through n for further treatment. The retentate stream from stage n is discharged to drain or used for other purposes requiring water of a lesser purity. Each of the permeate streams from the n-stages would combine into one header connecting to supply stream 42 for Fuhrer purification in the electrodeionization unit 10. A bleed may be taken from any of these permeate streams for connection to supply stream 44 of the concentrate compartments for increasing electrical conductivity in the electrodeionization unit 10.

Figure 5:
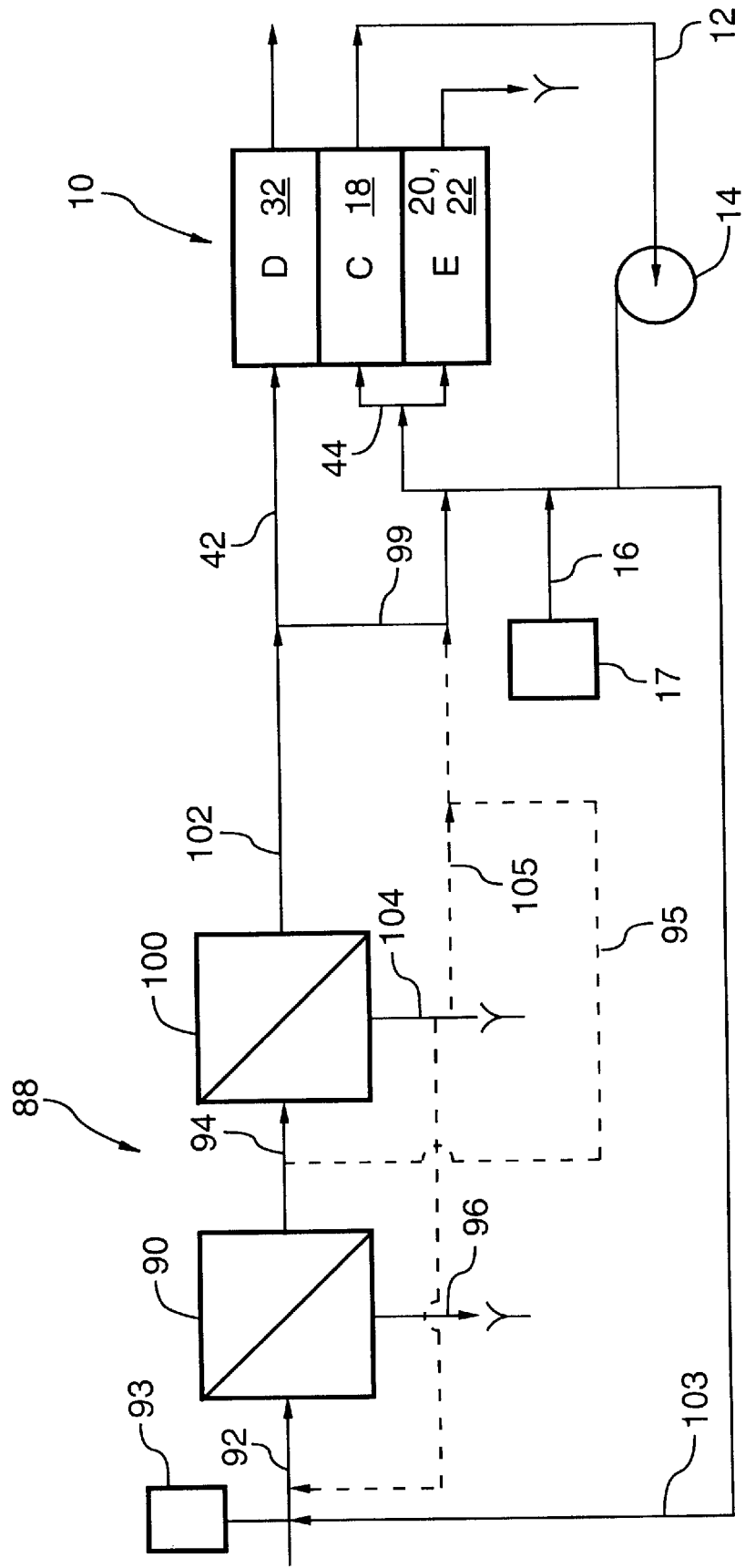
FIG. 5 is a schematic flowsheet of a fourth embodiment of the present invention in conjunction with the embodiment shown in FIG. 1.

A further embodiment of the present invention is illustrated in FIG. 5, wherein a reverse osmosis system 88 comprises a multiple-pass serial reverse osmosis system consisting of a plurality of reverse osmosis units in series, the number of passes corresponding to the number of such reverse osmosis units, each reverse osmosis unit effecting further purification of the permeate stream from the reverse osmosis unit preceding it. In the example of such embodiment particularly depicted in FIG. 5, the number of such passes is two, consisting of the two reverse osmosis units 90 and 100 in series. In this embodiment, water to be purified together with antiscalant from a portion of the concentrate loop solution in line 12 by way of line 103 is provided in supply stream 92 to reverse osmosis unit 90, and is separated into a first permeate stream 94 and first retentate stream 96 by membrane processes occurring therein. The first permeate stream 94 is discharged into the second reverse osmosis unit 100 for further purification, while retentate stream 96 is discharged to drain. In the second reverse osmosis unit 100, the first permeate stream 94 is separated into second permeate stream 102 and retentate stream 104 by membrane processes occurring therein. The second permeate stream 102 is connected to the electrodeionization unit 10 as supply stream 42 for further purification. Retentate stream 104 is either recycled back to supply stream 92, discharged to drain or can be used as electrolyte. Supplemental antiscalant can be provided by a second antiscalant injection unit 93.

To provide electrolyte make-up to the concentrate compartments 18 of the electrodeionization unit 10, a bleed 95 from either of first permeate stream 94, or a bleed 99 from second permeate stream 102, may be connected to supply stream 44 for the concentrate compartments 18. Retentate stream 104 from the second reverse osmosis unit 100 may also be used through line 105 for electrolyte make-up because stream 104 has already been subjected to purification in the first reverse osmosis unit 90, and is therefore relatively free of undesirable particles, organics and bacteria. Further, it is usually preferable to bleed from second retentate stream 104 wherein saline concentration is highest and, therefore, more likely to increase conductivity in electrodeionization unit 10.

It will be understood that the number of reverse osmosis passes in the reverse osmosis system 88 is not limited to two, and could include any plurality of passes, each containing a reverse osmosis unit and each having one or more stages. In this respect, the permeate streams from the passes are each discharged into a corresponding downstream reverse osmosis unit for further treatment. The permeate stream from the last pass is discharged into the electrodeionization unit 10 for further purification. Each of the retentate streams from the passes, with the exception of the first pass, is either recycled back to the inlet stream of the reverse osmosis unit of the first pass or is discharged to drain. A bleed may be taken from any of the permeate streams, or from any of the retentate streams with the exception of the retentate stream from the reverse osmosis unit of the first pass, for connection to supply stream 44 of the concentrate compartments 18 for increasing conductivity in the electrodeionization unit 10.

Figure 6:
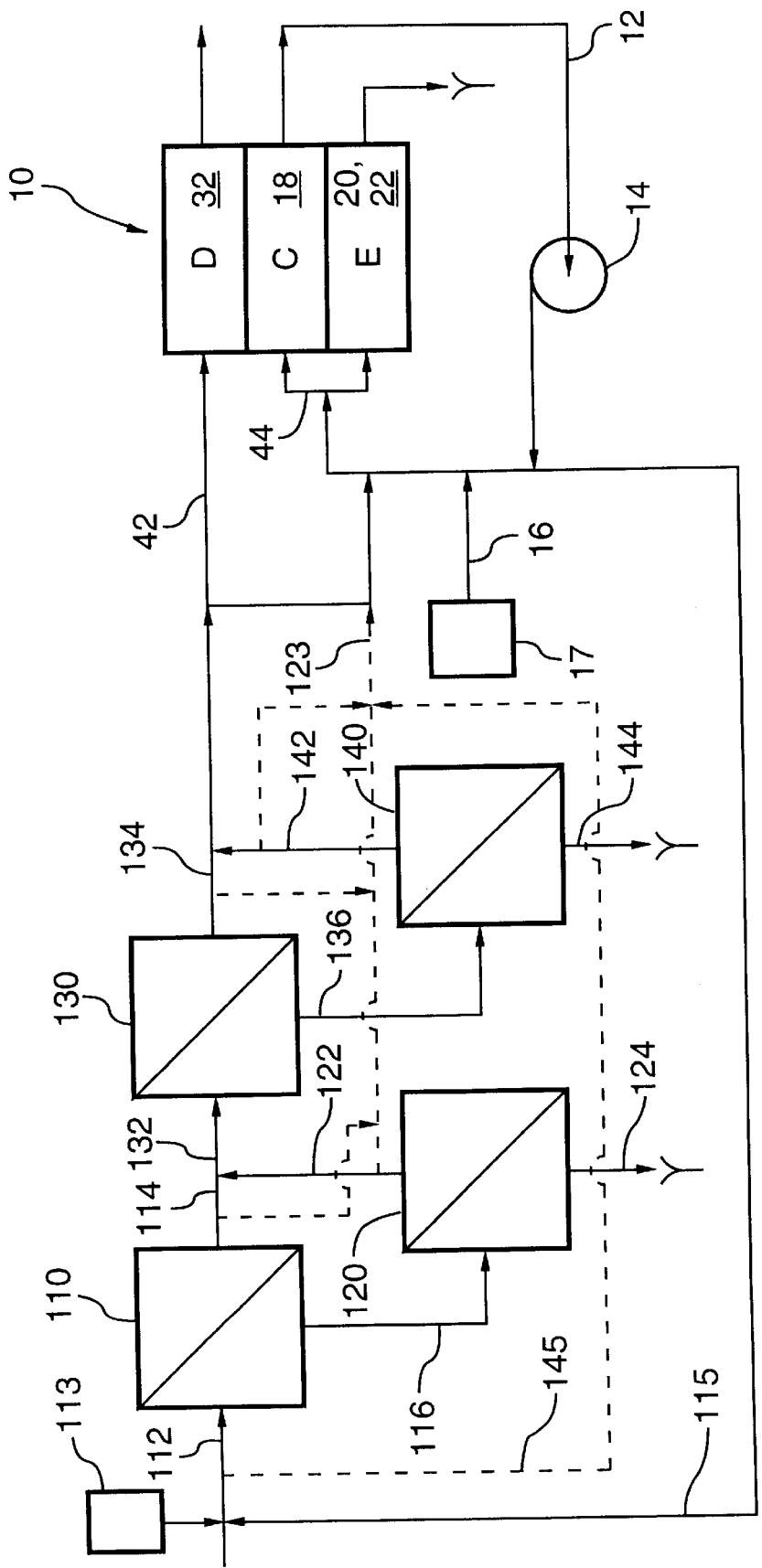
FIG. 6 is a schematic flowsheet of a fifth embodiment of the present invention in conjunction with the embodiment shown in FIG. 1.

In a further embodiment of the invention, shown in FIG. 6, the retentate streams from each of the passes may be discharged into a second stage reverse osmosis unit for further purification, yielding a further permeate stream to join a corresponding permeate stream from the same pass for further purification in a downstream reverse osmosis pass or in the electrodeionization unit 10. This variant combines aspects of each of the processes illustrated in FIGS. 4 and 5 and comprises two passes consisting of two stages each, each stage having one reverse osmosis unit. Therefore, the first pass comprises of first reverse osmosis stage 110 and second reverse osmosis stage 120, and the second pass comprises of third reverse osmosis stage 130 and fourth reverse osmosis stage 140. Water to be purified together with a portion of the concentrate loop recycle solution in line 12 by way of line 115 and supplemental antiscalant injection unit 113 is supplied to the first reverse osmosis unit 110 by supply stream 112, and is separated into first permeate stream 114 and first retentate stream 116 by membrane processes occurring therein. Retentate stream 116 is discharged into the second reverse osmosis stage 120, and subjected to membrane processes therein, causing separation of first retentate stream 116 into second permeate stream 122 and second retentate stream 124. The second permeate stream 122 joins the first permeate stream 114 to become supply stream 132 to the second pass for further treatment in the third reverse osmosis unit 130. The second retentate stream 124 is discharged to drain. Supply stream 132 enters the third reverse osmosis unit 130 and is separated into third permeate stream 134 and third retentate stream 136 by membrane processes occurring therein. Retentate stream 136 is discharged into the fourth reverse osmosis stage 140, and subjected to membrane processes therein, causing separation of third retentate stream 136 into fourth permeate stream 142 and fourth retentate stream 144. The fourth permeate stream 142 joins the third permeate stream 134 to connect to supply stream 42 for further purification in the electrodeionization unit 10. The fourth retentate stream 144 either is connected back to feed stream 112 to the first reverse osmosis unit 110 by line 145 or discharged to drain.

To effect electrolyte make-up in the concentrate compartments 18 of the electrodeionization unit 10, a bleed from either of first permeate stream 114, second permeate stream 122, third permeate stream 134, fourth permeate stream 142 or fourth retentate stream 144, or combinations thereof, may be connected to supply stream 44 by line 123 for feed to the concentrate compartments 18. It is most preferable to bleed from second permeate stream 122 through line 123 where saline concentration is highest and, therefore, more likely to increase conductivity in electrodeionization unit 10.

It is understood that the number of reverse osmosis passes and the number of reverse osmosis stages therein are each not limited to two, and could include any plurality of passes, so as to cause economic purification and recovery of water. Bleeds from any permeate or retentate stream from associated reverse osmosis units, with the exception of the retentate streams in the first pass, may be connected to the electrodeionization unit 10 for increasing conductivity thereof.

Further variations to the embodiments illustrated in FIGS. 4, 5 and 6 are contemplated and not limited to those shown in the Figures. For example, prior to connection to the supply stream 42 to the diluting compartments 32 of the electrodeionization unit 10, permeate streams from the reverse osmosis unit(s) may be subjected to further purification by separation processes, such as degasification. Additionally, unused antiscalant from the circulating loop 12 of the concentrate compartments 18 in the electrodeionization unit 10 preferably are connected to the supply streams for the reverse osmosis unit for inhibiting the formation of scale in that reverse osmosis unit, and any other downstream units, in a similar manner as the embodiment depicted in FIG. 3.

The present invention provides a number of important advantages. The antiscaling agents including pH control agents, antifouling scale suppressing agents, chelating agents and the like can be used in the electrodeionization unit in higher than normally commercially viable concentrations because of containment of the agents within the system by recycle within the electrodeionization unit and by recycle to one or more reverse osmosis units in series. This recycling of a relatively small flow of fluid from the electrodeionization unit into the larger influent flow to the reverse osmosis unit results in a suitably low concentration of antiscalant for economical reverse osmosis operation. The selective use of reverse osmosis permeate as make-up to the recycle loop to the concentration compartments utilizes salinity of the permeate to enhance electrical conductivity and efficiency of the cells with increased current flow at reduced voltages, thereby reducing electrical power requirements without the need and cost of separately adding salt to the system.

It will be understood, of course, that modifications can be made in the embodiments of the invention described herein without departing from the scope and purview of the invention as defined by the appended claims.

We claim:

1. A method for inhibiting formation of scale in an electrodeionization unit for deionizing water having an anode compartment at one end of the unit, a cathode compartment at the opposite end of the unit, and a plurality of diluting compartments alternating with concentrating compartments positioned between said anode and cathode compartments, comprising:

passing feed water to be deionized through the diluting compartments;

passing water or an aqueous solution for accepting ions from the feed water through the concentrating compartments, and through the anode and cathode compartments;

applying an electrical voltage between an anode and a cathode of said anode and cathode compartments, respectively, whereby ions in the feed water migrate to the water or aqueous solution in the concentrating compartments;

collecting and discharging aqueous solution from the anode and cathode compartments;

recycling water or an aqueous solution from the concentrating compartments as a concentrate stream through the concentrating compartments and through the anode and cathode compartments; and injecting an antiscalant to the concentrate stream recycling through the concentrating compartments and through the anode and cathode compartments in an amount effective to inhibit scale formation in the concentrating compartments and in the cathode compartment.

2. A method as claimed in claim 1 in which the effective amount of antiscalant in the concentrate stream is in the range of 1 to 400 ppm.

3. A method as claimed in claim 2 in which the antiscalant is selected from the group consisting of sulphuric acid, hydrochloric acid, polyacrylic acid, derivatives of polyacrylic acids consisting of co-polymers with sulfonates, phosphonate antiscalants and sodium hexametaphosphate, EDTA and CDTA complexing agents, amido succinic acid chelating agent, non-oxidizing biocidal agents, and combinations thereof.

4. A method as claimed in claim 1, in which the antiscalant is sulphuric acid in the range of about 500 to 0.5 ppm or hydrochloric acid in the range of about 365 to about 0.4 ppm.

5. A method as claimed in claim 1, in which the antiscalant is sodium hexametaphosphate in an amount in the range of about 5 to about 200 ppm.

6. A method as claimed in claim 1, in which the antiscalant is sodium hexametaphosphate in an amount in the range of about 25 to about 100 ppm.

7. A method for purifying and deionizing water for inhibiting formation of scale in a reverse osmosis unit comprising one or more stages and in an electrodeionization unit in series in which water to be purified and deionized passes through the reverse osmosis unit to produce a permeate stream and a retentate discharge stream, and in which the electrodeionization unit has an anode compartment at one end of the unit, a cathode compartment at the opposite end of the unit, and a plurality of diluting compartments alternating with concentrating compartments positioned between said anode and cathode compartments, comprising:

passing feed water to be purified and deionized through the reverse osmosis unit; passing permeate from the reverse osmosis unit through the diluting compartments of the deionization unit;

passing water or aqueous solution for accepting ions from the feed water through the concentrating compartments, and through the anode and cathode compartments;

applying an electrical voltage between an anode and a cathode of said anode and cathode compartments, respectively, whereby ions in the feed water migrate to the water or aqueous solution in the concentrating compartments;

collecting and discharging aqueous solution from the anode and cathode compartments;

recycling water or aqueous solution from the concentrating compartments as a concentrate stream through the concentrating compartments and through the anode and cathode compartments;

injecting an antiscalant to the concentrate stream recycling through the concentrating compartments and through the anode and cathode compartments effective to inhibit scale formation in the concentrating compartments and in the cathode compartment;

bleeding a portion of the concentrate stream containing antiscalant;

combining and passing said portion of the bled concentrate containing an amount of antiscalant with the feed water through the reverse osmosis unit, adjusting the amount of antiscalant in the water to the reverse osmosis unit to provide an effective amount of antiscalant to inhibit scale formation in the reverse osmosis unit, and passing the permeate stream through the dilute compartments of the deionization unit.

8. A method as claimed in claim 7, adjusting the antiscalant in the water to the reverse osmosis unit to an amount in the range of 1 to 75 ppm effective to inhibit scaling.

9. A method as claimed in claim 8 in which at least a portion of the permeate of one or more stages is added to the concentrate stream passing through the concentrating compartments and through the anode and cathode compartments to add electrolyte thereto, thereby increasing electrical conductivity.

10. A method as claimed in claim 8 in which the antiscalant is selected from the group consisting of sulphuric acid, hydrochloric acid, polyacrylic acid, derivatives of polyacrylic acids consisting of co-polymers with sulfonates, phosphonate antiscalants, sodium hexametaphosphate, EDTA and CDTA complexing agents, amido succinic acid chelating agent, non-oxidizing biocidal agents, and combinations thereof.

11. A method as claimed in claim 7, subjecting said feed water to the reverse osmosis units to a plurality of passes, each pass comprising one or more stages, wherein permeate from at least one of the stages of one of the passes is combined with the concentrate stream for passage through the concentrating compartments and through the anode and cathode compartments to add electrolyte thereto, thereby increasing electrical conductivity.

12. A method as claimed in claim 11 in which retentate from at least one of the stages, excepting from the first reverse osmosis pass, is combined with the concentrate stream for passage through the concentrating compartments and through the anode and cathode compartments to add electrolyte thereto, thereby increasing electrical conductivity.

* * * * *